United States Patent [19]

Pauley et al.

[11] Patent Number: 4,617,753
[45] Date of Patent: Oct. 21, 1986

[54] SPINNER BAIT COMPONENT SYSTEM

[75] Inventors: Gregory L. Pauley, P.O. Box 123, 208 Sioux St., Fort Peck, Mont. 59223; Wayne V. Zahn, Minot, N. Dak.

[73] Assignee: Gregory L. Pauley, Fort Peck, Mont.

[21] Appl. No.: 699,575

[22] Filed: Feb. 8, 1985

[51] Int. Cl.⁴ .............................. A01K 85/00
[52] U.S. Cl. .................. 43/42.19; 43/42.09
[58] Field of Search ............ 43/42.19, 42.13, 42.11, 43/42.09, 42.14, 42.18, 42.32

[56] References Cited

U.S. PATENT DOCUMENTS

| | | | |
|---|---|---|---|
| 713,435 | 11/1902 | Hildebrandt . | |
| 1,314,868 | 9/1919 | Gray . | |
| 2,486,635 | 11/1949 | Coats | 43/28 |
| 2,586,679 | 2/1952 | Martin | 43/42.19 |
| 2,603,023 | 7/1952 | Parish | 43/42.13 |
| 2,714,273 | 8/1955 | Torrance | 43/42.13 |
| 2,817,179 | 12/1957 | Kelley | 43/44.99 |
| 3,095,664 | 7/1963 | Nichols | 43/42.19 |
| 3,488,877 | 1/1970 | Carabasse | 43/42.09 |
| 3,604,140 | 9/1971 | Nelson | 43/42.13 |
| 3,858,343 | 1/1975 | Goforth | 43/42.19 |
| 3,974,587 | 8/1976 | Levake et al. | 43/42.19 |

FOREIGN PATENT DOCUMENTS

| | | | |
|---|---|---|---|
| 945252 | 11/1948 | France | 43/42.19 |
| 945936 | 12/1948 | France | 43/42.19 |

Primary Examiner—Gene P. Crosby
Attorney, Agent, or Firm—Douglas L. Tschida

[57] ABSTRACT

A component system for spinner baits and the like, the components of which are constructed of a molded polymer. The system includes a clevis-like mechanism having a longitudinally extending bore and an integral resilient arm which permits the mounting of single thickness metal or new plastic spinner blades of varying thickness thereto. A molded, neutral buoyancy, scented bead chain may be combined therewith to provide advantageous lure action and fish attractant properties.

12 Claims, 14 Drawing Figures

SPINNER BAIT COMPONENT SYSTEM

BACKGROUND OF THE INVENTION

The present invention relates to fishing lures and, in particular, to a molded component system for spinner baits and the like including a clevis-like attachment mechanism having an integrally formed resilient clevis arm whereby a spinner blade or other lure accessory may be added and changed at will. A further feature of the invention comprises a connected neutral buoyancy bead chain that can be used therwith. A still further feature comprises molded spinner blades for use therewith having a varying thickness profile.

Spinner baits for years have been one of the most reliable lures of the trout fishermen, not to mention their use for all other species of fish and types of fishing from the lakes to the streams. Such lures are typically constructed from a number of piece-part components which, depending upon the overall lure design, can be altered either as to size, shape, color or placement relative to each other. Typically, however, the components include a line-attaching swivel, a stamped metal spinner blade, a colored attractant portion (e.g. one or more beads), the hook and means for attaching the hook to a wire carrier. Depending upon the type of fishing, such lures may also include live bait holders, such as used in trolling, or can be constructed for use independent of live bait.

Because of the wide variety of possible permutations of the individual components, a fisherman oftentimes includes a variety of sizes, colors and configurations of spinner baits in his tackle box to insure the availability of the proper bait for the prevailing conditions. Such a requirement, however, oftentimes results in the expenditure of significant sums of monies for a single type of spinner bait and which expenditures must be repeated for each different type of lure.

Some examples of some previously known spinner baits and the components used in the construction thereof can be seen upon directing attention to U.S. Pat. Nos. 713,435; 1,314,868; 2,486,635; 2,586,679; 2,603,023; 2,714,273; 3,095,664; 3,604,140 and 3,974,587. As disclosed from these patents, most spinner baits were and still are constructed about a central twisted wire support member and relative to which means are added for attaching and detaching the hook and metal spinner blade. Individual beads being mounted as desired to attract either the fisherman's or fish's attention.

Also to be noted is that most of the spinner blades are attached to the support via a metal clevis and may not be changed, except upon reversing the order of assembly. While too some of the clevises have included a spring metal arm to permit the changing of the spinner blade, the clevis is not intended as a separate fish-attracting component but rather only as a means for replaceably attaching the spinner blade. Furthermore, nowhere does the art show any of the clevis, spinner blade or beads as being fabricated of plastic, either neutrally buoyant or scented.

The present invention, in contrast to the prior art, contemplates a spinner bait component system molded from suitable plastics. The system includes a multi-purpose molded plastic, weed resistant clevis-like attachment mechanism which can also be used as a part of the attractant portion of the spinner bait. As a part thereof, an integrally formed clevis arm permits the replaceable mounting of one or more desired plastic or metal spinner blades thereto. A longitudinal bore formed therethrough, in turn, permits the mounting of the clevis member to a variety of spinner baits and/or its use independent thereof. Such a component thus minimizes the number of lure construction components while advantageously permitting the fishermen to adjust to fishing conditions.

A further feature of the invention is the use of a connected molded bead chain that is fabricated to exhibit a neutral buoyancy in water. By breaking one or more beads from the chain, the presentation of the lure can be varied as well as the useable depth range. The chain or others of the components may also be fabricated from scented plastics.

Another feature of the system comprises molded plastic spinner blades having a thickness profile varying over the area of the blade. In combination, therefore, entirely new permutations of lures and spinner baits in colors not previously achievable can thus now be produced.

The above objects, advantages and distinctions of the present invention, as well as its construction will be described in greater detail hereinafter with respect to the appended drawings. Before referring thereto, however, it is to be recognized that the following description is made with respect to the presently preferred embodiments only and is not intended to in any way be self-limiting.

SUMMARY OF THE INVENTION

A plastic spinner bait component system wherein the components can be used in the construction of fishing lures or independently to augment the presentation of other lures. One component of the system comprises a molded clevis-like attachment mechanism having at least one integrally formed clevis arm projecting therefrom and whereby spinner blades and the like may be detachably mounted to the clevis. A longitudinally-extending bore permits the slidable mounting of the clevis to the spinner bait and/or line. The clevis is constructed from a relatively dense resilient plastic material with an appropriate aerodynamic shape and color so as to move through the water and impart a desired action or fish-attracting characteristic to the lure.

Another component of the system comprises an integrally connected bead chain which is fabricated from a neutral buoyancy material and which may or may not be scented, just as the other components. Overall lure presentation can be adjusted by varying the length of the bead chain.

A third component comprises molded spinner blades which are fabricated in conventional sizes and wherein the thickness profile of the blade is varied across the area of the blade so as to impart a desired action.

In one embodiment, the body of the clevis is formed with a conical forward portion mounted to a cylindrical aft portion and from which aft portion the clevis arm projects orthogonally in a subtending relation to the conical forward portion.

In a second embodiment, the body of the clevis is formed with a hemi-teardrop-like shape and from the trailing-end of a flat side of which the clevis arm projects and extends to the forward end.

DESCRIPTION OF THE PREFERRED EMBODIMENT

Figure 1:
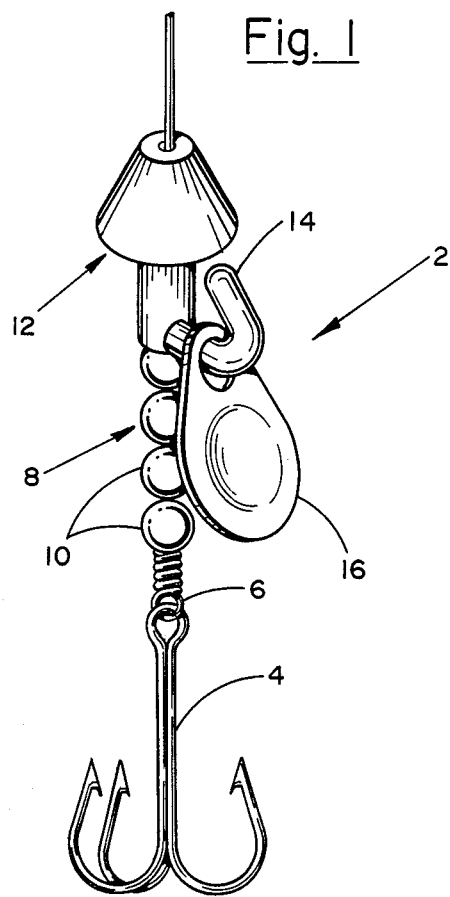
FIG. 1 shows a perspective view of a spinner bait including all of the components of the the present invention.

Referring to FIG. 1, a perspective assembly view is shown of one possible spinner bait 2 that might be constructed from the various components of the present invention. The spinner bait 2 comprises a treble hook 4 which is coupled to a centrally extending formed wire member 6 and along which is positioned a bead chain 8. The bead chain 8 is comprised of a length of neutral buoyancy plastic or polymer material, such as polyethylene, that is molded to have the appearance of a number of individual beads 10. Where previously individual plastic beads were used, now it is contemplated that a bead chain 8 would be substituted therefor. The length of the chain 8 being tailored to the size lure or presentation desired. Specifically and depending upon the size and type of spinner bait 2, the length and location of the chain 8 can be adjusted to affect the buoyancy of the presentation and the lure's action relative to the employed fishing technique. Because of the advantages of plastics and the ability to mold the chain 8, the head chain 8 may also be fabricated in any number of colors, from solids to flourescents to metal flake colors. At present, it is also contemplated that the bead chain 8 will be fabricated from a scented plastic, such as an anise scent, although other scents could also be incorporated therein.

Mounted above the bead chain 8 is a clevis-like mechanism, which is fabricated with an integral clevis arm 14 and to which a plastic spinner blade 16 is attached. Because of the advantageous construction of the present clevis 12, the spinner blade 16 may be changed at will and/or additional blades may be added to provide the spinner bait 2 with a desired action and/or fish-attracting capability. The details of the construction will, however, be discussed below.

Figure 2:
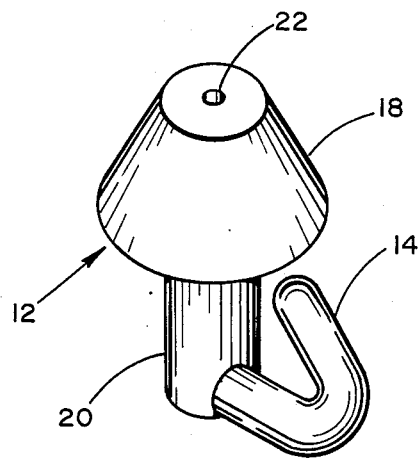
FIG. 2 shows a perspective view of the clevis-like portion of the spinner bait of FIG. 1.

Turning attention next to FIG. 2, a detailed perspective view is shown of the clevis-like attachment mechanism 12 of FIG. 1. As depicted, the clevis 12 is fabricated as an integral structure with a conically-formed forward portion 18 positioned over a cylindrically-formed aft portion 20, and from the bottom of which aft portion 20 projects the integrally formed clevis arm 14. Longitudinally extending through the clevis 12 is a lumen or bore 22 which permits the mounting of the clevis 12 about a fishing line and/or the wire support member 6.

As presently constructed, the clevis 12 is fabricated from a molded plastic material of a sufficient rigidity to maintain its shape, yet permit a snap-locking action with the spinner blade 16. Any other polymer-based material of a similar density and resilience could however be used so long as it was sufficiently strong to prevent against the blade 16 from becoming detached during use and to withstand the forces required to free the lure 2 from weeds, etc.

Some advantages of this construction are that the clevis 12 may now be designed to exhibit separate and distinct fish attracting properties and may also be used in a modular fashion. That is, the clevis 12, like the bead chain 8, can be constructed in any number of colors and finishes and in any desired size and shape. Like the bead chain 8, the clevis 12 can also be added anywhere along the fishing line to enhance the presentation. For example, when fishing walleyes, oftentimes individual non-buoyant beads are added to the fishing line. Now, however, one may use the present neutral buoyancy bead chain 8 and/or the present plastic spinner blade 16 via the clevis 12 to achieve a floating live bait rig. By selecting a lighter density clevis material, the clevis 12 too can be made to be partially buoyant. It is also to be appreciated that because of the clevis' ability to facilitate change, still other fishing accessories, from sinkers to hooks, might be secured about the clevis arm 14.

Figure 3:
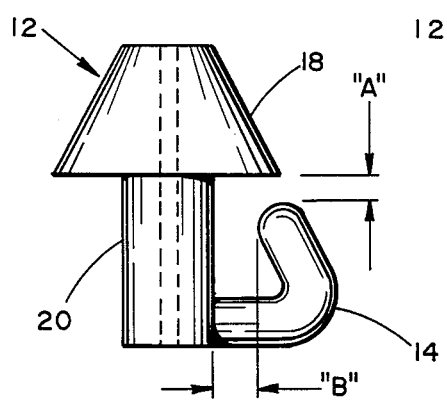
FIG. 3 shows a side view of the clevis of FIG. 2.
Figure 4:
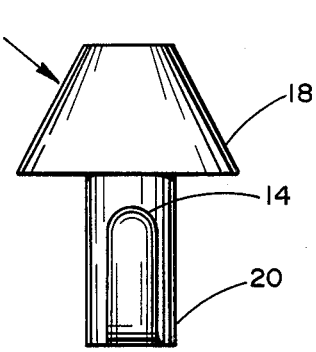
FIG. 4 shows a front view of the clevis of FIG. 2.
Figure 5:
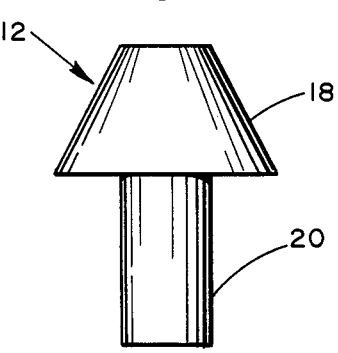
FIG. 5 shows a back view of the clevis of FIG. 2.
Figure 6:
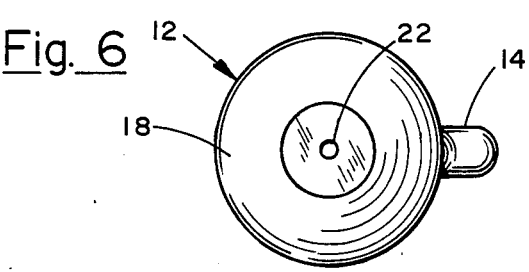
FIG. 6 shows a top view of the clevis of FIG. 2.
Figure 7:
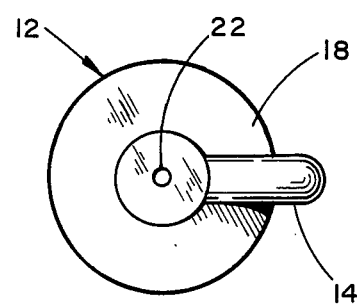
FIG. 7 shows a bottom view of the clevis of FIG. 2.

Directing attention next to FIG. 3, a side view of the clevis 12 is shown and wherein the spacing of the arm 14 relative to the conical and cylindrical fore and aft portions 18 and 20 can be seen. Specifically, the dimensions of the spacings "A" and "B" are sized to achieve a first deflection of the clevis arm 14 when passing the blade 16 through the A dimension and a snap action when passing the blade 16 through the B dimension. As presently contemplated and while not shown to scale, the B dimension would be approximately 0.005 inch less than the A dimension to produce the snap action, while the A dimension is sized to be slightly less than the thickness of the typical blade 16. Once mounted, enough space is provided between the arm 14 and the cylindrical portion 20 to permit the blade 16 to rotate freely about the arm 14. From FIG. 3, the relative mounting of the bore 22 can also be seen. FIGS. 4–7 further depict the constructional details of the clevis 12 in its respective front, back, top and bottom views.

Figure 8:
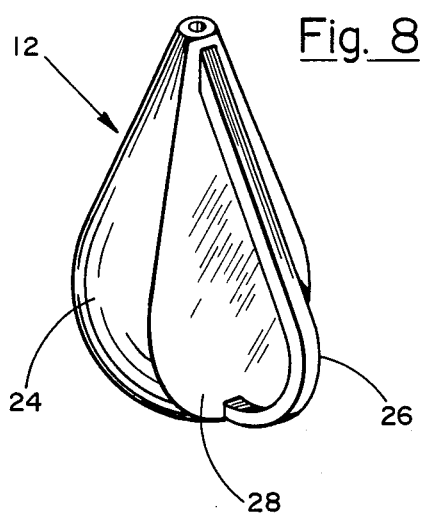
FIG. 8 shows an alternative hemi-teardrop-like embodiment of the clevis of the present invention.

Turning attention next to FIG. 8, an alternative embodiment of the invention is shown wherein the body 24 of another clevis 25 is fabricated with a teardrop-like shape having one flattened longitudinal surface 28 and wherein an integral clevis arm 26 radiates outwardly and upwardly from the bottom of the surface 28 to a pointed forward end of the body 24. A space is again provided between the distal end of the arm 26 and the surface 28 for attaching the spinner blade 16 in a snap lock fashion. In contrast to the clevis 12 of FIG. 1, the spinner blade 16 now, slides up-and-down along the clevis arm 26 and which produces a different lure action than that of the clevis 12.

As before, the clevis 23 can be fabricated from any number of polymer-based materials in any number of colors and finishes and with any desired buoyancy. to enhance the presentation of the lure and/or live bait fished therewith. One drawback to the clevis 23 however is that it is more prone to snagging in weeds, whereas the conical head portion 18 of the clevis 12 minimizes this type of possible problem.

FIGS. 9 to 13, show respective side, front, back, top and bottom views of the embodiment of FIG. 8 and wherein its constructional details become more apparent.

Lastly, it is to be noted that unlike its predecessors the present spinner blade 16 is construced from a molded plastic. Consequently, the blade 16 can be made in the same colors as the bead chain 8 or clevis 12 and which colors can be mixed and matched during lure assembly to achieve any desired color scheme. A further advantage of plastics is that costly hand painting is now avoided, along with attendant wearing of the paint over time.

Figure 14:
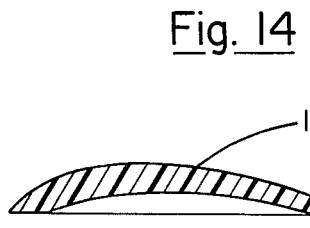
FIG. 14 shows a lengthwise cross section view through the spinner blade of FIG. 1.
Figure 9:
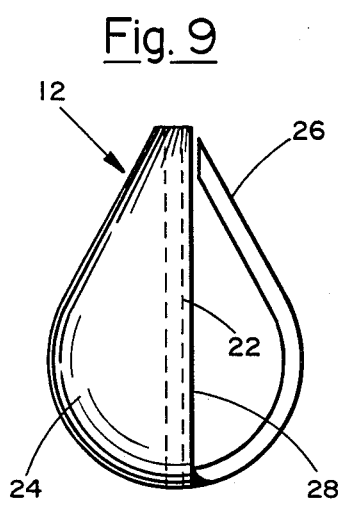
FIG. 9 shows a side view of the embodiment of FIG. 8.
Figure 10:
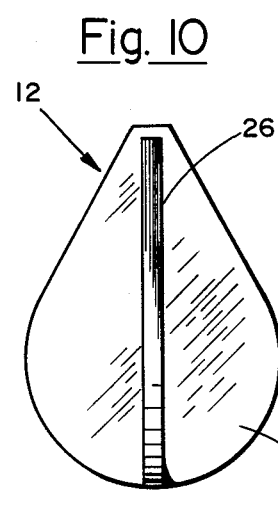
FIG. 10 shows a front view of the embodiment of FIG. 8.
Figure 11:
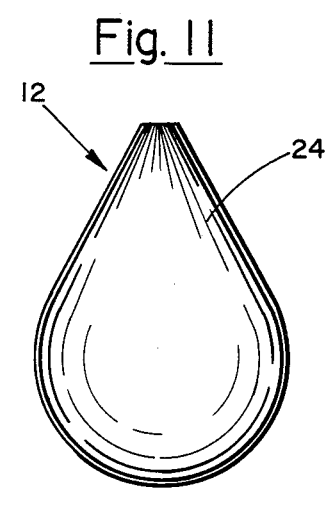
FIG. 11 shows a back view of the embodiment of FIG. 8.
Figure 12:
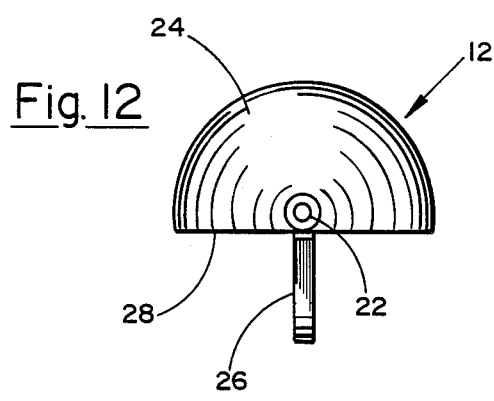
FIG. 12 shows a top view of the embodiment of FIG. 8.
Figure 13:
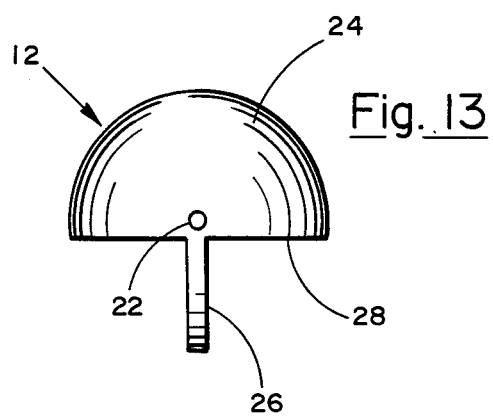
FIG. 13 shows a bottom view of the embodiment of FIG. 8.

With attention directed to FIG. 14 and unlike single thickness predecessor blades, the present blade 16 is molded with a varying thickness. That is, at the mounting hole, the thickness is approximately the same as for metal blades, while at the aft end, the thickness is approximately three times that. This thickness variation and attendant shifting of the blade's weight distribution, in turn, has been found to cause the blade 16 to wobble, and otherwise enhance lure movement, instead of merely lying flat against the clevis and which has been found to occur when the blade is made of a uniform thickness. While, too, the blades 16 are presently constructed in conventional "Indiana", "Colorado" and "Willow-leaf" styles and sizes, it is to be appreciated that numerous other styles and sizes are also possible.

From the foregoing, it should be apparent that any number of permutations of lure presentations can be constructed with the above components. Also, any number of shapes and sizes can be advantageously employed in the construction of the clevis 12, bead chain 8 and blades 16, along with numerous colors and scent schemes, so as to permit the fabrication of a variety of new spinner baits. It is accordingly contemplated that the following claims should be interpreted so as to include all those equivalent embodiments within the spirit and scope thereof.

What is claimed is:

1. Fishing lure apparatus comprising:
    a body member having forward and aft portions and a bore extending lengthwise therethrough, wherein said forward portion extends conically rearward to a surface of largest diameter and from which surface a cylindrical aft portion of smaller diameter extends and wherein said aft portion includes an integral arm projecting outwardly therefrom and such that a distal end thereof lies rearward in spaced apart relation to he forward portion's surface of largest diameter, said arm being deflectable to permit the securing of a fishing accessory thereover.

2. Apparatus as set forth in claim 1 including a polymeric spinner blade mounted over said arm, said spinner blade having a concave varying thickness profile tapering from a relatively thin end containing a mounting hole therethrough to a thicker opposed end.

3. Fishing apparatus as set forth in claim 1 wherein said body member is made of a scented polymer.

4. Fishing apparatus as set forth in claim 1 wherein said body member is made of a buoyant polymer, relative to water.

5. Apparatus as set forth in claim 2 wherein said polymeric spinner blade is molded from a scented polymer.

6. A fishing clevis comprising:
    a body member having the shape of a teardrop with one lengthwise flat surface and a bore extending lengthwise therethrough from a narrow fore-end to a relatively wide aft end, wherein an integral arm projects outwardly from said flat surface and such that a distal end thereof lies in spaced apart adjacent relation to the fore-end, said arm being deflectable to permit the securing of a fishing accessory thereover.

7. A fishing clevis comprising:
    a substantially solid body member having forward and aft portions and a bore extending lengthwise therethrough, wherein when viewed end-on from a fore-end said forward portion flares outward from said bore with increasing cross sectional area as it extends rearward and wherein the aft portion includes at least one integral resilient arm projecting outwardly therefrom and such that a distal end thereof lies in spaced apart adjacent relation to said body member for securing a fishing accessory thereover.

8. A clevis as set forth in claim 7 wherein the distal end of said arm lies rearward of a region of said forward portion whereby the distal end is shielded by the forward portion.

9. A clevis as set forth in claim 7 wherein said body member is made of a scented polymer.

10. A clevis as set forth in claim 7 wherein said body member is made of a buoyant polymer, relative to water.

11. Fishing lure apparatus comprising in combination:
    (a) a filiamentary support member;
    (b) a clevis member slidably mounted along said support member and comprising a body member having forward and aft portions and a bore extending lengthwise therethrough, wherein said forward portion when viewed end-on from a fore-end flares outward from said bore with increasing cross sectional area as it extends rearward and wherein said aft portion includes at least one integral resilient arm projecting outwardly therefrom and such that a distal end thereof lies in spaced apart adjacent relation to said body member; and
    (c) a polymeric spinner blade mounted over said arm at a mounting hole therethrough, said spinner blade having a concave varying thickness profile tapering from a relatively thin end to a thicker opposed end.

12. Apparatus as set forth in claim 11 further including an elongated member slidably mounted along said support member and formed in the shape of a contiguous string of beads.

* * * * *